United States Patent [19]

Wolff

[11] Patent Number: 5,067,535

[45] Date of Patent: Nov. 26, 1991

[54] WORKTABLE

[75] Inventor: Robert Wolff, Engeln, Fed. Rep. of Germany

[73] Assignee: Werkzeug-gesellschaft mit beschranter Haftung, Weilbern, Fed. Rep. of Germany

[21] Appl. No.: 503,982

[22] Filed: Apr. 4, 1990

[30] Foreign Application Priority Data

Apr. 4, 1989 [DE] Fed. Rep. of Germany ....... 3910826

[51] Int. Cl.$^5$ .............................................. B25H 1/00
[52] U.S. Cl. ................................ 144/286 R; 144/1 R; 144/286 A; 269/139; 269/901
[58] Field of Search .............. 144/1 R, 84, 87, 286 R, 144/286 A; 269/79, 244, 88, 139, 901; 182/33, 33.5; 83/574

[56] References Cited

U.S. PATENT DOCUMENTS

| | | | |
|---|---|---|---|
| 3,734,151 | 5/1973 | Skripsky | 144/286 R |
| 4,236,599 | 12/1980 | Luff et al. | 144/286 R |
| 4,362,196 | 12/1982 | Ferdinand et al. | 144/286 R |
| 4,726,405 | 2/1988 | Bassett | 144/286 R |
| 4,763,706 | 8/1988 | Rice et al. | 144/84 |
| 4,884,604 | 12/1989 | Rice et al. | 144/84 |
| 4,940,067 | 7/1990 | Beard | 144/84 |

Primary Examiner—W. Donald Bray
Attorney, Agent, or Firm—Antonelli, Terry, Stout & Kraus

[57] ABSTRACT

A worktable with a tabletop divided into a workbench panel and a tool mounting panel mounted on a tabletop frame. The tool mounting panel is adapted for the mounting of power tools such as a circular saw, a saber saw or compass saw, and a router or milling machine, and is pivotably attached to the tabletop frame such that it can be swung upwards and positioned at an inclined position above the workbench panel, thereby making it easy to mount and dismount power tools. The worktable has foldable legs which are attached to the tabletop frame only underneath the workbench panel. The legs can be folded underneath the tool mounting panel without obstructing a tool mounting area on the tool mounting panel.

15 Claims, 6 Drawing Sheets

WORKTABLE

BACKGROUND OF THE INVENTION

The present invention relates to a worktable, and more particularly to a worktable having a tabletop divided into a workbench panel and a tool mounting panel on which power tools such as a circular saw, a saber saw or compass saw, and a router or milling machine can be mounted. The tool mounting panel is pivotably mounted such that it can be swung upwards and positioned in an inclined position above the workbench panel. Furthermore, the worktable is foldable so it can be stored as a flat compact package.

A worktable having both a workbench panel and a tool mounting panel is described in West German Offenlegungsschrift DE 28 19 033 A1. This prior-art worktable is based on a conventional fixed table designed to be anchored to a wall. The top of the worktable serves as a workbench panel, and a swing-out tool mounting panel is mounted on the bottom of the workbench panel with parallelogram-type guide arms. When it is not needed, the tool mounting panel is swung beneath the workbench panel for storage. When it is needed, the tool mounting panel is swung upwards and towards the front of the workbench panel into a working position even with the surface of the workbench panel. However, amateur handymen frequently do not have enough free space to permanently set up such a fixed worktable. They usually need a foldable worktable which can be set up in a garage or other location, and which can be folded into a flat compact package and stored away or hung up on a garage wall when not in use. This prior-art worktable has the additional disadvantage that the swing-out tool mounting panel tends to vibrate in its working position. This vibration can be eliminated, if at all, only with expensive locking and bracing devices.

Many foldable worktables are known in the prior art. However, these prior-art worktables generally have a relatively small tabletop which is designed to be used solely as a tool mounting panel, such as the worktable described in West German Offenlegungsschrift DE 26 17 800 A1, or solely as a workbench panel, such as those described in French Patent Publication No. 2 350 179, U.K. Patent Application Publication GB 2 025 831 A, and West German Gebrauchsmuster G 84 23 345 U1. These prior-art worktables thus have limited utility. However, handymen usually need worktables which have a maximum degree of utility.

SUMMARY OF THE INVENTION

The underlying object of the present invention is to provide a worktable having a large tabletop divided into a workbench panel and a tool mounting panel. The worktable can be folded into a flat compact package for storage, and when unfolded, is inherently stable and provides a tabletop that does not vibrate Furthermore, the tool mounting panel is pivotable so that power tools can be easily mounted on it and dismounted from it.

This object has been attained in the present invention by providing a worktable with a joint top frame on which both the workbench panel and the tool mounting panel are mounted. The tool mounting panel is pivotably mounted on the tabletop frame such that it can be swung upwardly and positioned at an inclined position above the workbench panel. Two pairs of legs are fastened to the tabletop frame under the workbench panel, and are connected together by connecting members such that they can be folded underneath the tool mounting panel such that they do not obstruct a tool mounting area of the tool mounting panel. Furthermore, the worktable is provided with a work-holding fixture at the other end of the table from the tool mounting panel.

The present invention provides a number of advantages. The joint top frame provides a stable nonvibrating support for the workbench panel and the tool mounting panel such that the entire tabletop formed by the workbench panel and the too mounting panel provide a high-load bearing working surface. Tools mounted on the tool mounting panel do not interfere with the use of the workbench panel, and fixtures associated with the workbench panel such as the work-holding fixture does not interfere with the use of tools mounted on the tool mounting panel. Furthermore, the pivotal mounting of the tool mounting panel to mount and dismount tools such as a circular saw, a compass saw, or a milling machine, because the tool mounting panel can be swung upwardly into position where it is positioned at an angle above the workbench panel. In such position, the other side of the tool mounting panel is readily accessible for the mounting or dismounting of a tool, and the top of the tool mounting panel is maintained at a distance from the workbench panel which is sufficient to prevent the tool mounted on the tool mounting panel from contacting the workbench panel. When the tool mounting panel is folded back down onto the frame it becomes a quasi-rigid extension of the workbench panel.

By mounting the legs on the tabletop frame solely underneath the workbench panel, and making them foldable underneath the tool mounting top provides the additional advantage that the worktable can be folded into a flat package which is only a little bit longer than the length of the entire worktable top. When the worktable is unfolded, the tool mounting panel does extend a certain distance beyond the footprint defined by the four legs of the worktable, but the position of the relatively heavy workbench panel above the footprint, and the provision of a tool-holding fixture on the side of the workbench panel away from the tool mounting panel shifts the center of gravity of the worktable towards the footprint to such an extent that a high standing stability is achieved.

In accordance with another feature of the invention, a tool tray is mounted on the connecting members connecting together the two pairs of legs. The tool tray provides a convenient place to store tools for ready use and additionally makes the table underframe more rigid and helps to shift the center of gravity of the worktable toward the workbench panel, thereby further enhancing the standing stability of the worktable.

The above and other objects, features, and advantages of the present invention will become more apparent from the following description when taken in connection with the accompanying drawings which show, for the purposes of illustration only, several embodiments in accordance with the present invention.

DESCRIPTION OF THE PREFERRED EMBODIMENTS

Figure 1:
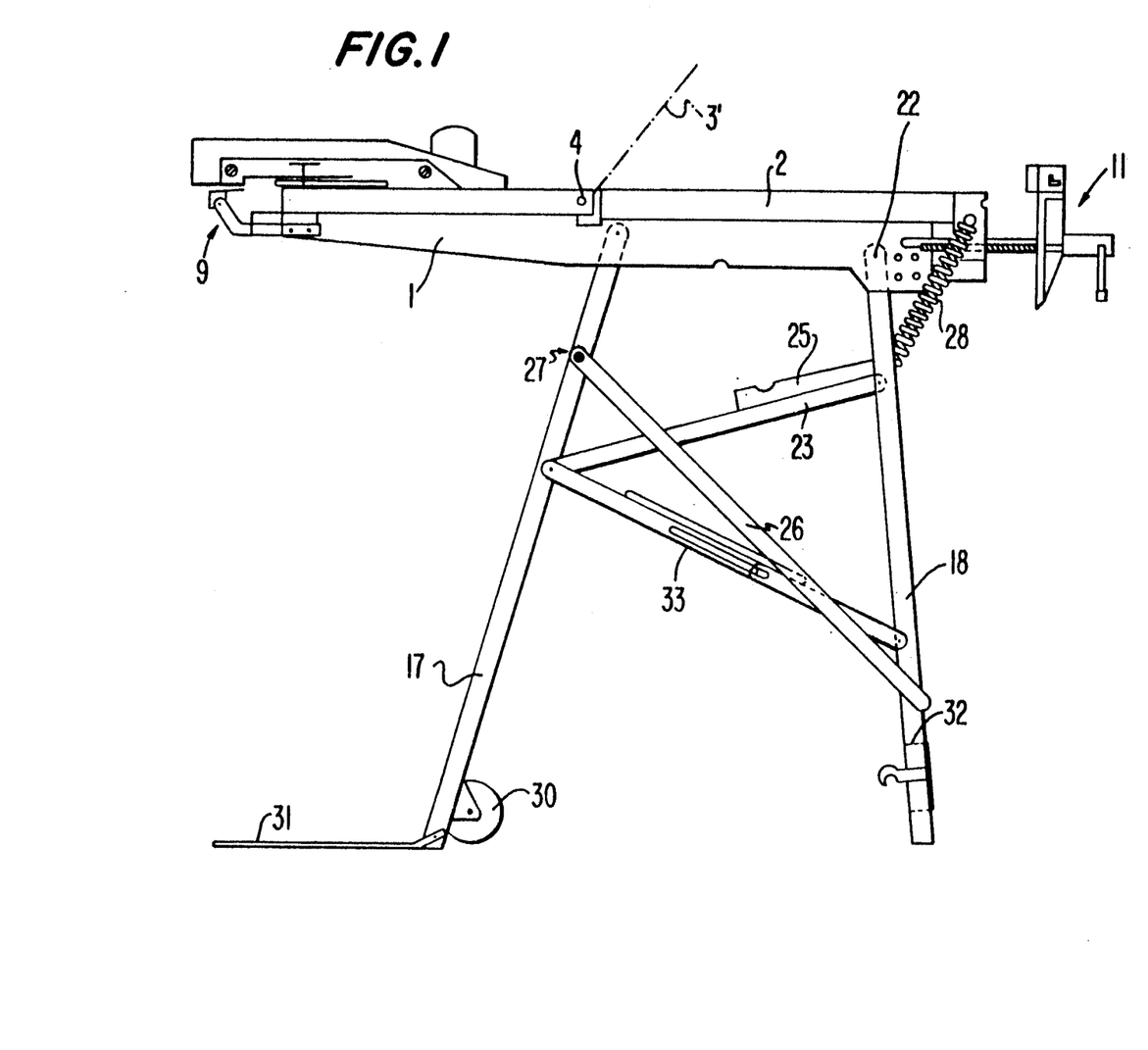
FIG. 1 is a side view of a worktable according to one embodiment of the present invention.
Figure 2:
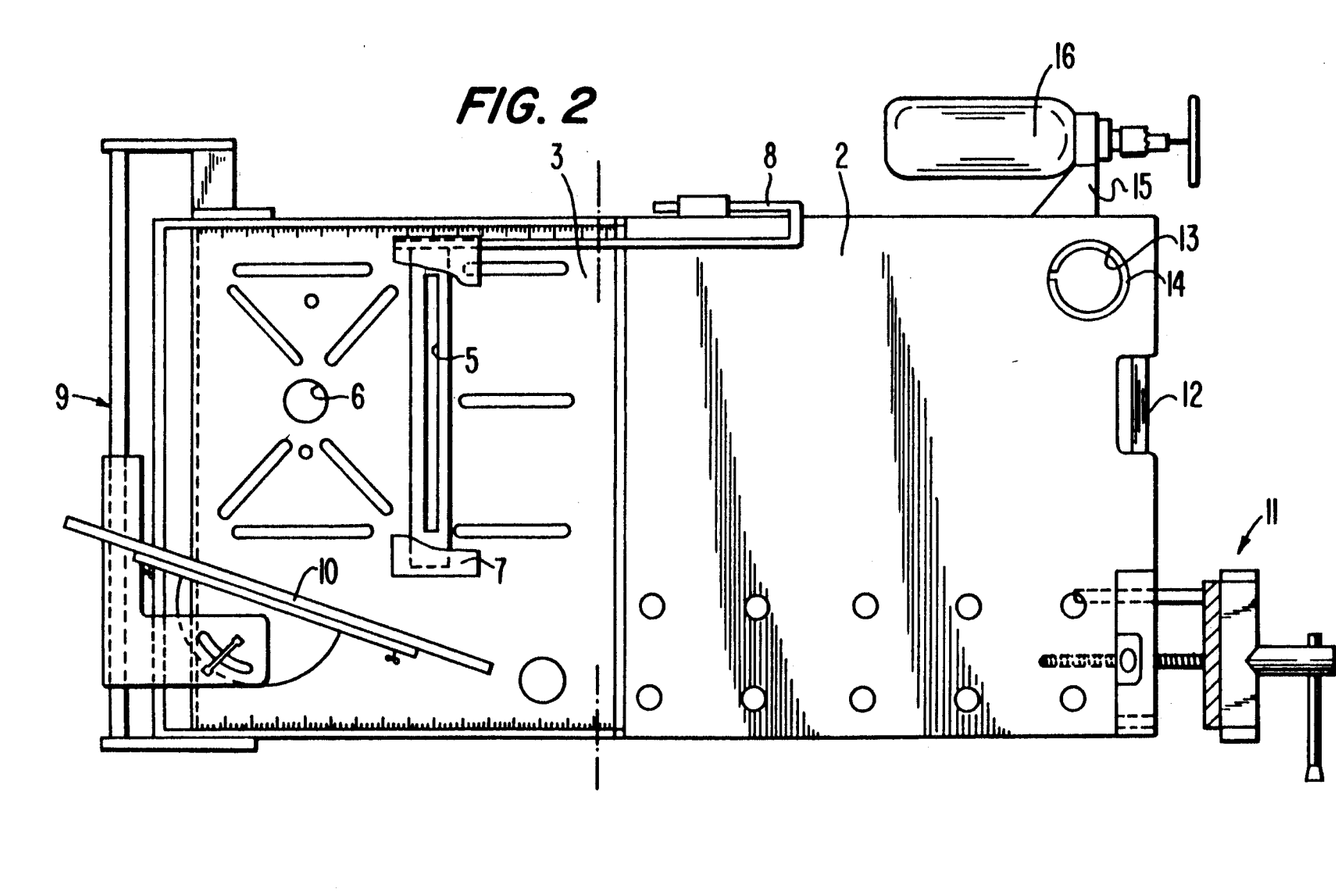
FIG. 2 is a top view of the worktable in FIG. 1.

Referring now to the drawings wherein like reference numerals are used throughout the various views to designate like parts, FIGS. 1-2 show a worktable according to one embodiment of the present invention. The worktable has a rectangular tabletop frame 1 on which a substantially rectangular workbench panel 2 is mounted on one end, and a tool mounting panel 3 is mounted at the other end. Tool mounting panel 3 is pivotably mounted about an axis 4 such that it can be swung upwardly into an obliquely upwardly oriented position 3' above workbench panel 2. Tool mounting panel 3 is provided with a slot 5 for a circular saw blade and with a hole 6 for a milling machine bit or compass saw blade. A guard 7 for covering the circular saw blade is pivotably mounted by a U-shaped lever 8 mounted on one edge of workbench panel 2. A holder and guide means 9 for a pivotal guide stop 10 is mounted on tabletop frame 1 at the end on which tool mounting panel 3 is mounted.

Figure 3:
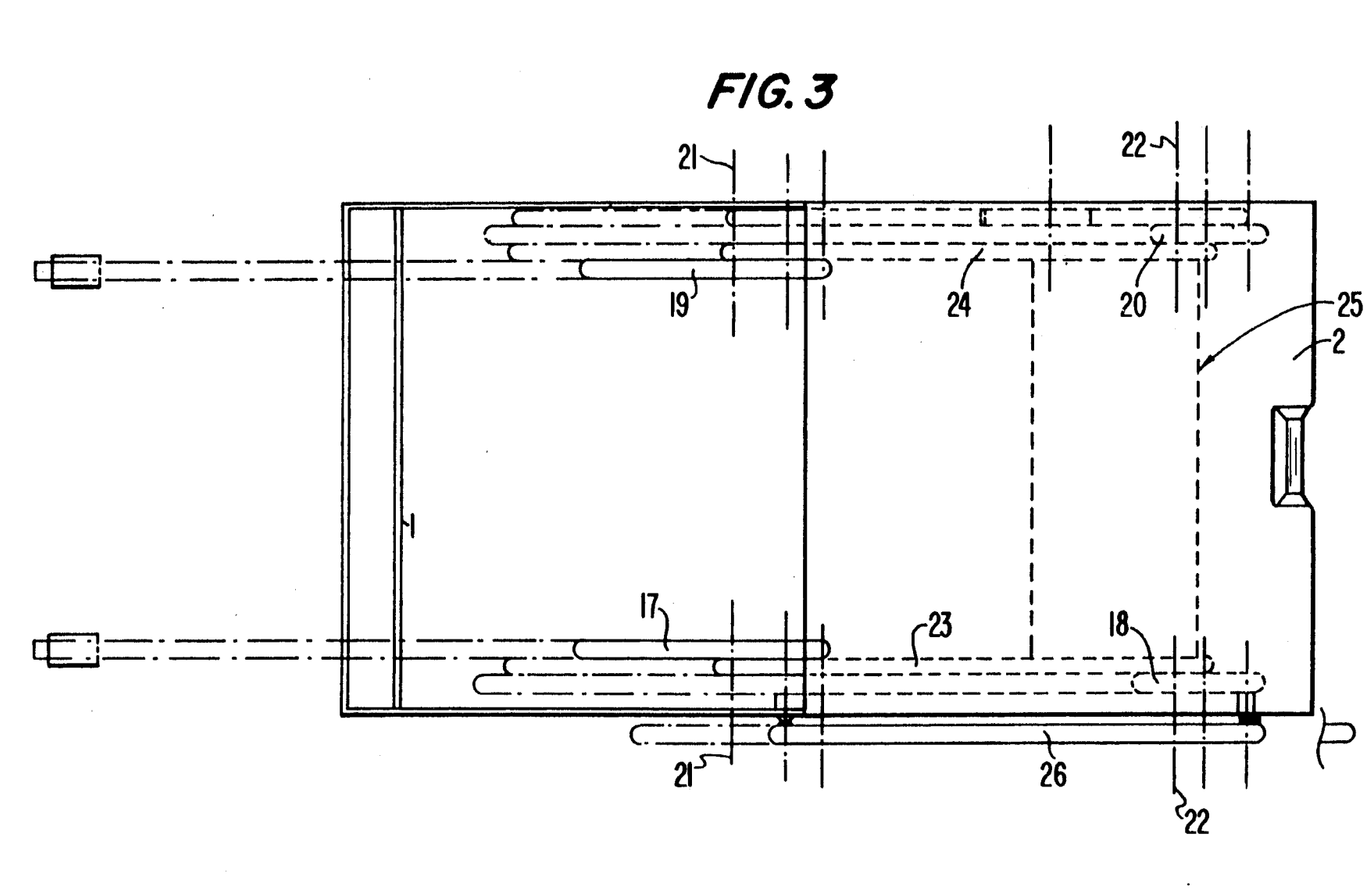
FIG. 3 is a top view diagram for use in explaining the operation of the foldable underframe of the worktable in FIG. 1.

Several devices for mounting work or tools are provided at the end of the worktable which is opposite to the tool mounting panel 3. For example, vise 11 is mounted at one end of the worktable. A standard clamping ring 14 for accepting a standard 43 mm diameter clamping shaft is provided beneath a hole 13 in workbench panel 2, to permit the mounting of a hand drill provided with a corresponding standard adapter pin above the surface of workbench panel 2. A clamping ring 15 is mounted on the side of the worktable to either workbench 2 or tabletop frame 1 to permit the mounting of a hand drill 16 next to workbench 2. Four legs 17, 18, 19, and 20 are pivotably mounted on tabletop frame 1 underneath workbench 2 so as to be foldable about axes 21 and 22 and shown in FIG. 3 towards the end of the tabletop frame on which tool mounting panel 3 is mounted. Legs 17 and 18 on one side of the worktable are connected together by connecting rod 23, and legs 19 and 20 on the other side of the worktable are connected together by connecting rod 24. A tool tray 25 is mounted on connecting rods 23 and 24 adjacent to rear legs 18 and 20. Legs 17 and 18 on one side of the worktable are connected together by a locking bar 26 which is pivotably connected to the bottom end of rear leg 18 is releasably locked to the upper end of leg 17 and point 27. Springs 28 are connected between rear legs 18 and 20 and the rear end of the worktable so as to maintain the legs in their unfolded position. Legs 19 and 20 on the opposite side of the worktable from blocking bar 26 are provided with a releasable two-part articulated locking device 29 which locks the legs in an open position when it is locked, and permits them to be folded when it is unlocked by pushing it in the upward direction. Front legs 17 and 19 are each equipped with one caster 30 on their rear sides facing rear legs 18 and 20. These casters are positioned upwards on legs 17 and 19 such that when the legs are unfolded, they are positioned above the floor on which the table is set.

A foot panel 31 is pivotably mounted on front legs 17 and 19. A user can stand on this foot panel when performing sawing or other operations to further enhance the stability of the table. Rear legs 18 and 20 are joined at the bottom by a footbar 32.

Figure 4:
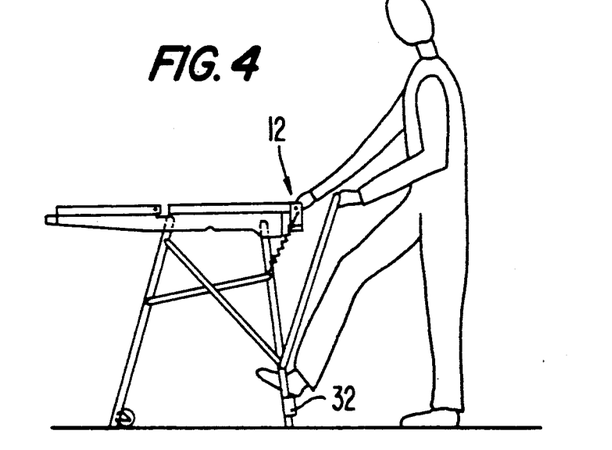
FIGS. 4-6 are simplified illustrations showing successive positions during the folding of the worktable.
Figure 5:
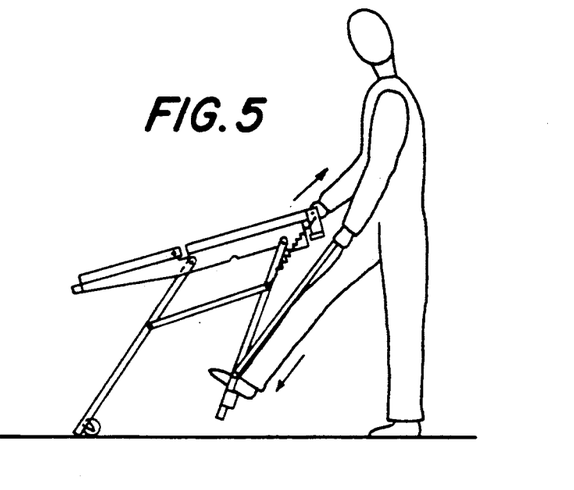
Figure 6:
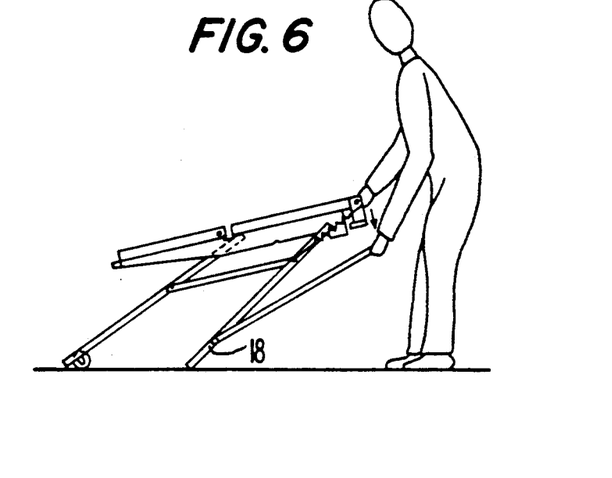
Figure 7:
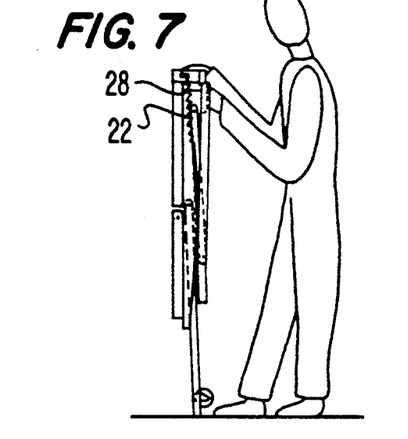
FIGS. 7-9 are simplified illustrations showing successive positions in unfolding the worktable.
Figure 8:
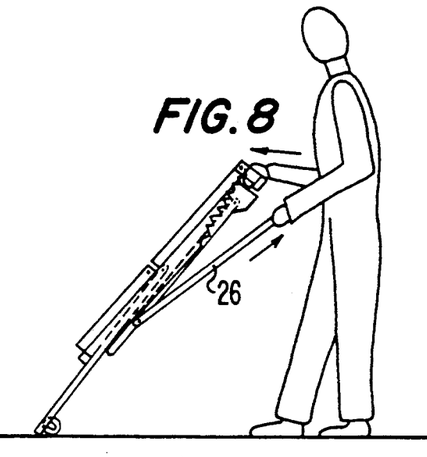
Figure 9:
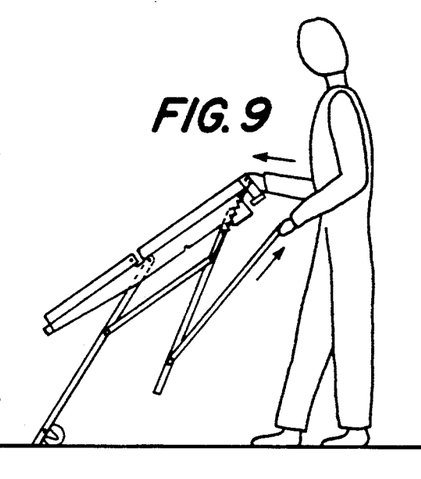

FIGS. 4-6 schematically illustrate the folding of the worktable, and FIGS. 7-9 schematically illustrate the unfolding of the worktable. In order to simplify the illustrations, no tools are shown mounted on tool mounting panel 3 and locking device 29 are not shown. However, these devices do not interfere with the folding and unfolding of the table.

When folding the table, as shown in FIGS. 4-6 the operator first releases locking device 29 (not shown) by bending it upwardly, and then detaches locking bar 26 from front leg 17 and swings it rearwardly, holding it in one hand and using it has a handle. With his other hand, the user grasps handle 12 at the rear edge of the table and pulls on handle 12 while pressing with one foot on footbar 32, thereby beginning to fold the table. When the table is in the partially folded-up position shown in FIG. 5, the user places the rear legs 18 and 20 on the floor, enabling the weight of the table, particularly when the saw or other tool is attached to tool mounting panel 3, to overcome the restoring force of springs 28, causing the table to be folded even further. Eventually, rear legs 18 and 20 pass a dead center position wherein springs 28 act to keep the legs folded, as shown in FIG. 7. The folded table can be moved about on casters 20 like a wheelbarrow, or it can be stored in a space-saving fashion while standing on edge. The free end of locking bar 26 is attached to the table in a folded position.

When unfolding the table, as shown in FIGS. 7-9, the operator again uses locking bar 26 as a handle to pull the legs away from the folded position. Once the legs are moved past the dead center position, springs 28 serve to open the table the rest of the way. In spite of the large weight of the table, especially when a power tool is mounted on tool mounting panel 3, and in spite of the fact that the legs must be moved against the tension springs 28 until the dead center position is reached the folding and unfolding operations of the table can be performed quickly and without the danger of pinching one's fingers or arm.

Figure 10:
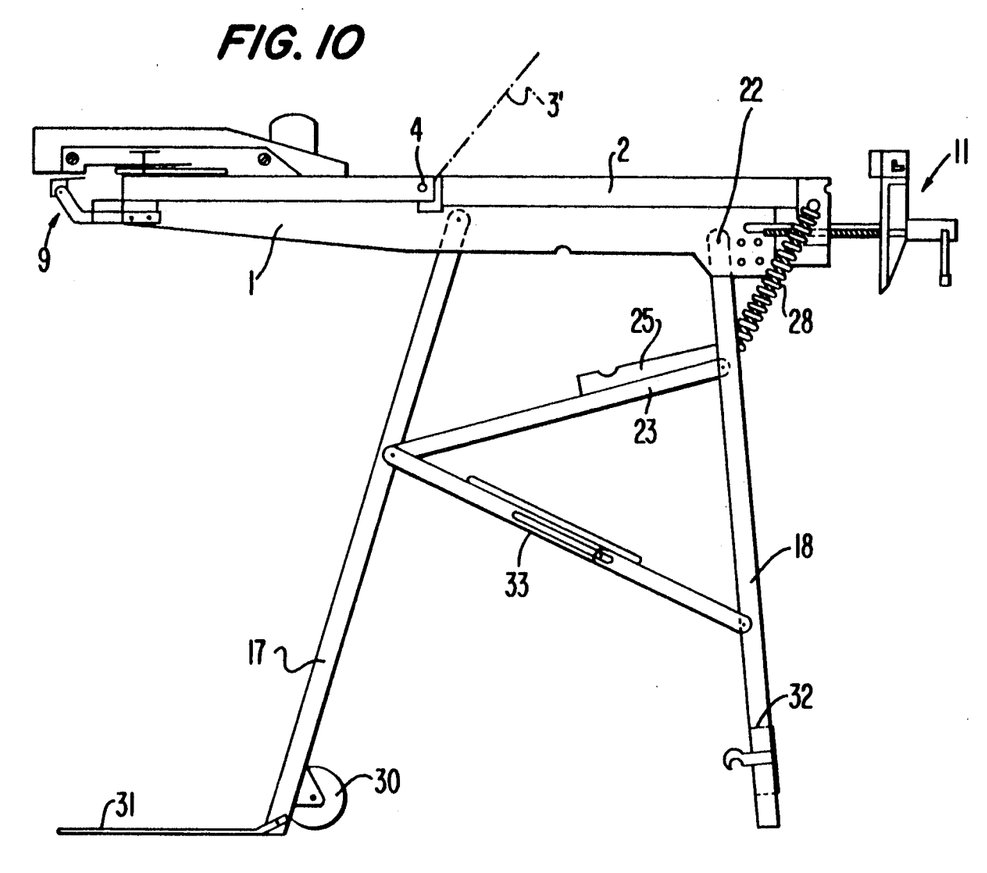
FIG. 10 shows a worktable according to a second embodiment of the present invention.

FIG. 10 shows another embodiment according to the present invention. Locking bar 26 is replaced by a second releasable two-part articulated locking device 33 similar to locking device 29 shown in FIG. 1, and extending in parallel to locking device 29. In folding and unfolding this table, the operator stands to the side of the table in front of legs 17 and 18 and grasps handle 12 in one hand and the opposite end of the end in the other hand.

While I have shown and described several embodiments i accordance with the present invention, it is understood that the same is not limited to the details shown and described therein, but is susceptible to numerous changes and modifications as known to one of ordinary skill in the art. Therefore, I do not wish to be limited to the details shown and described herein but intend to cover such all modifications as are encompassed by the appended claims.

What is claimed is:

1. A worktable comprising:
   a table top frame;

a workbench panel mounted on the frame adjacent to a first end of the frame;

a tool mounting panel pivotably mounted on the frame adjacent to a second end of the frame such that the tool mounting panel is positionable in an inclined position above the workbench panel;

a first pair of legs attached to a first side of the frame and a second pair of legs attached to a second side of the frame;

a first connecting member connecting the legs of the first pair of legs to each other and a second connecting member connecting the legs of the second pair of legs to each other, said legs being pivotably attached to the frame and the first and second connecting members are pivotably attached to the legs such that the legs are foldable towards the second end of the frame;

a tool mounting area provided on the tool mounting panel, said legs being foldable beneath the tool mounting panel without obstructing the tool mounting area; and spring means attached to the frame and to the legs for holding the legs in an unfolded position when the legs are unfolded from a folded position beneath the tool mounting panel past a dead center position to the unfolded position, and for holding the legs in the folded position when the legs are folded from the unfolded position past the dead center position to the folded position.

2. A worktable comprising:

a table top frame;

a workbench panel mounted on the frame adjacent to a first end of the frame;

a tool mounting panel pivotably mounted on the frame adjacent to a second end of the frame such that the tool mounting panel is positionable in an inclined position above the workbench panel;

a first pair of legs attached to a first side of the frame and a second pair of legs attached to a second side of the frame;

a first connecting member connecting the legs of the first pair of legs to each other and a second connecting member connecting the legs of the second pair of legs to each other, said legs being pivotably attached to the frame and the first and second connecting members are pivotably attached to the legs such that the legs are foldable towards the second end of the frame;

a tool mounting area provided on the tool mounting panel, said legs being foldable beneath the tool mounting panel without obstructing the tool mounting area, and wherein a first end of the workbench panel is adjacent to the first end of the frame, a second end of the workbench panel is adjacent to a first end of the tool mounting panel, and a second end of the tool mounting panel is adjacent to the second end of the frame, and wherein a first leg of each pair of legs is pivotably attached to the frame adjacent to the first end of the workbench panel and a second leg of each pair of legs is pivotably attached to the frame adjacent to the second end of the workbench panel.

3. A worktable according to claim 2, further comprising a first caster attached to a side of the second leg of the first pair of legs facing towards the first leg of the first pair of legs, and a second caster attached to a side of the second leg of the second pair of legs facing towards the first leg of the second pair of legs, wherein the casters are attached to the first legs such that the casters do not touch the ground when the legs are unfolded and the worktable is placed on the ground in a standing position.

4. A Worktable according to claim 2, further comprising a handle provided at the first end of the frame and a third connecting member connecting the first leg of the first pair of legs to the first leg of the second pair of legs, wherein the handle is adapted to be grasped by a first hand of an operator while the operator is folding and unfolding the legs and the third connecting member is adapted to be pushed on by a foot of the operator while the operator is folding the legs.

5. A worktable according to claim 4, further comprising a locking member pivotably attached to the first leg of one of the first and second pairs of legs and releasably attached to the second leg of the one pair of legs for releasably locking the one pair of legs in an unfolded position, wherein the locking member is adapted to be detached from the second leg of the one pair of legs and to be grasped by a second hand of the operator while the operator is folding and unfolding the legs.

6. A worktable according to claim 2, further comprising a foot panel pivotably attached to the second legs of the first and second pairs of legs, wherein the foot panel is adapted to be pivoted into contact with the ground when the legs are unfolded and the worktable is placed on the ground in a standing position.

7. A worktable comprising:

a table top frame;

a workbench panel mounted on the frame adjacent to a first end of the frame;

a tool mounting panel pivotably mounted on the frame adjacent to a second end of the frame such that the tool mounting panel is positionable in an inclined position above the workbench panel;

a first pair of legs attached to a first side of the frame and a second pair of legs attached to a second side of the frame;

a first connecting member connecting the legs of the first pair of legs to each other and a second connecting member connecting the legs of the second pair of legs to each other, said legs being pivotably attached to the frame and the first and second connecting members are pivotably attached to the legs such that the legs are foldable; and spring means attached to the frame and to the legs for holding the legs in an unfolded position when the legs are unfolded from a folded position past a dead center position to the unfolded position, and for holding the legs inn the folded position when the legs are folded from the unfolded position past a dead center position to the folded position.

8. A worktable comprising:

a table top frame;

a workbench panel mounted on the frame adjacent to a first end of the frame;

a tool mounting panel pivotably mounted on the frame adjacent to a second end of the frame such that the tool mounting panel is positionable in an inclined position above the workbench panel;

a first pair of legs attached to a first side of the frame and a second pair of legs attached to a second side of the frame;

a first connecting member connecting the legs of the first pair of legs to each other and a second connecting member connecting the legs of the second pair of legs to each other, said legs being pivotably attached to the frame and the first and second connecting members are pivotably attached to the legs such that the legs are foldable, and a first caster attached to a first leg of the first pair of legs and a second caster attached to a first leg of the second pair of legs, wherein the casters are attached to the first legs such that the casters do not touch the ground when the legs are unfolded and the worktable is placed on the ground in a standing position.

9. A worktable further comprising:

a table top frame;

a workbench panel mounted on the frame adjacent to a first end of the frame;

a tool mounting panel pivotably mounted on the frame adjacent to a second end of the frame such that the tool mounting panel is positionable in an inclined position above the workbench panel;

a first pair of legs attached to a first side of the frame and a second pair of legs attached to a second side of the frame;

a first connecting member connecting the legs of the first pair of legs to each other and a second connecting member connecting the legs of the second pair of legs to each other, said legs being pivotably attached to the frame and the first and second connecting members are pivotably attached to the legs such that the legs are foldable; and a locking member pivotably attached to the a first leg of one of the first and second pairs of legs and releasably attached to a second leg of the one pair of legs for releasably locking the one pair of legs in an unfolded position.

10. A worktable according to claim 9, further comprising a releasable two-part articulated locking member pivotably attached to the legs of the other pair of the first and second pairs of legs for releasably locking the other pair of legs in an unfolded position.

11. A worktable comprising:

a table top frame;

a workbench panel mounted on the frame adjacent to a first end of the frame;

a tool mounting panel pivotably mounted on the frame adjacent to a second end of the frame such that the tool mounting panel is positionable in an inclined position above the workbench panel;

a first pair of legs attached to a first side of the frame and a second pair of legs attached to a second side of the frame;

a first connecting member connecting the legs of the first pair of legs to each other and a second connecting member connecting the legs of the second pair of legs to each other, said legs being pivotably attached to the frame and the first and second connecting members are pivotably attached to the legs such that the legs are foldable; and a first releasable two-part articulated locking member pivotably attached to the legs of the first pair of legs for releasably locking the first pair of legs in an unfolded position, and a second releasable two-part articulated locking member pivotably attached to the legs of the second pair of legs for releasably locking the second pair of legs in an unfolded position.

12. A worktable according to claim 11, further comprising a tool tray mounted on the connecting members.

13. A worktable according to claim 11, further comprising work holding means mounted on at least one of the frame and the workbench panel.

14. A worktable according to claim 11, further comprising tool holding means mounted on at least one of the frame and the workbench panel.

15. A worktable according to claim 11, wherein the tool mounting panel is adapted for the mounting of a circular saw, a saber saw or compass saw, and a router or milling machine.

* * * * *